United States Patent [19]

Thompson et al.

[11] Patent Number: 5,394,901
[45] Date of Patent: Mar. 7, 1995

[54] EXHAUST PRESSURE MODULATION VALVE

[75] Inventors: Derek Thompson, North Hykham; Robert G. Baines, Selby, both of United Kingdom

[73] Assignee: Wabco Automotive (UK) Limited, Warwickshire

[21] Appl. No.: 50,292

[22] PCT Filed: Nov. 13, 1991

[86] PCT No.: PCT/GB91/02004

§ 371 Date: May 12, 1993

§ 102(e) Date: May 12, 1993

[87] PCT Pub. No.: WO92/08887

PCT Pub. Date: May 29, 1992

[30] Foreign Application Priority Data

Nov. 13, 1990 [GB] United Kingdom ................ 9024644

[51] Int. Cl.$^6$ .......................... F16K 21/02; F02D 9/06
[52] U.S. Cl. ................................ 137/513.3; 137/522; 137/527; 123/323; 188/273
[58] Field of Search ............... 137/513.3, 522, 527, 137/484; 123/323; 188/273

[56] References Cited

U.S. PATENT DOCUMENTS

| | | | |
|---|---|---|---|
| 2,428,708 | 10/1947 | Heftler | 137/527 X |
| 2,947,392 | 8/1960 | Heine | 123/323 X |
| 3,153,427 | 10/1964 | Burtis | 137/527 |
| 3,625,249 | 12/1971 | Karr | 137/527 |
| 4,111,166 | 9/1978 | Alstrin et al. | 123/323 |
| 4,220,008 | 9/1980 | Wilber et al. | 123/323 X |
| 4,254,752 | 3/1981 | Friddell et al. | 123/323 |
| 4,707,987 | 11/1987 | Atkin | 123/323 X |
| 4,750,459 | 6/1988 | Schmidt | 123/323 |
| 4,835,963 | 6/1989 | Hardy | 123/323 X |
| 4,923,167 | 5/1990 | Schmidt | 123/323 X |

FOREIGN PATENT DOCUMENTS

| | | |
|---|---|---|
| 0180332 | 5/1986 | European Pat. Off. . |
| 1198272 | 12/1959 | France . |
| 25 05 675 | 8/1976 | Germany . |
| 2648676 | 9/1977 | Germany ............... 123/323 |
| 3211920 | 10/1983 | Germany . |
| 3835545 | 4/1990 | Germany . |
| 783900 | 10/1957 | United Kingdom . |
| 1043865 | 9/1966 | United Kingdom . |
| 1044282 | 9/1966 | United Kingdom . |

*Primary Examiner*—John Rivell
*Attorney, Agent, or Firm*—Meltzer, Lippe, Goldstein

[57] ABSTRACT

An exhaust gas pressure modulation valve for a diesel engine vehicle combines the functions of an exhaust brake and a warm-up valve and has a single butterfly valve (12) to close the exhaust passage. The butterfly is reactive and opens automatically at a predetermined back pressure to prevent engine damage. The butterfly includes a small bypass passage or aperture (29) to permit a low throughput of exhaust gas when closed.

10 Claims, 4 Drawing Sheets

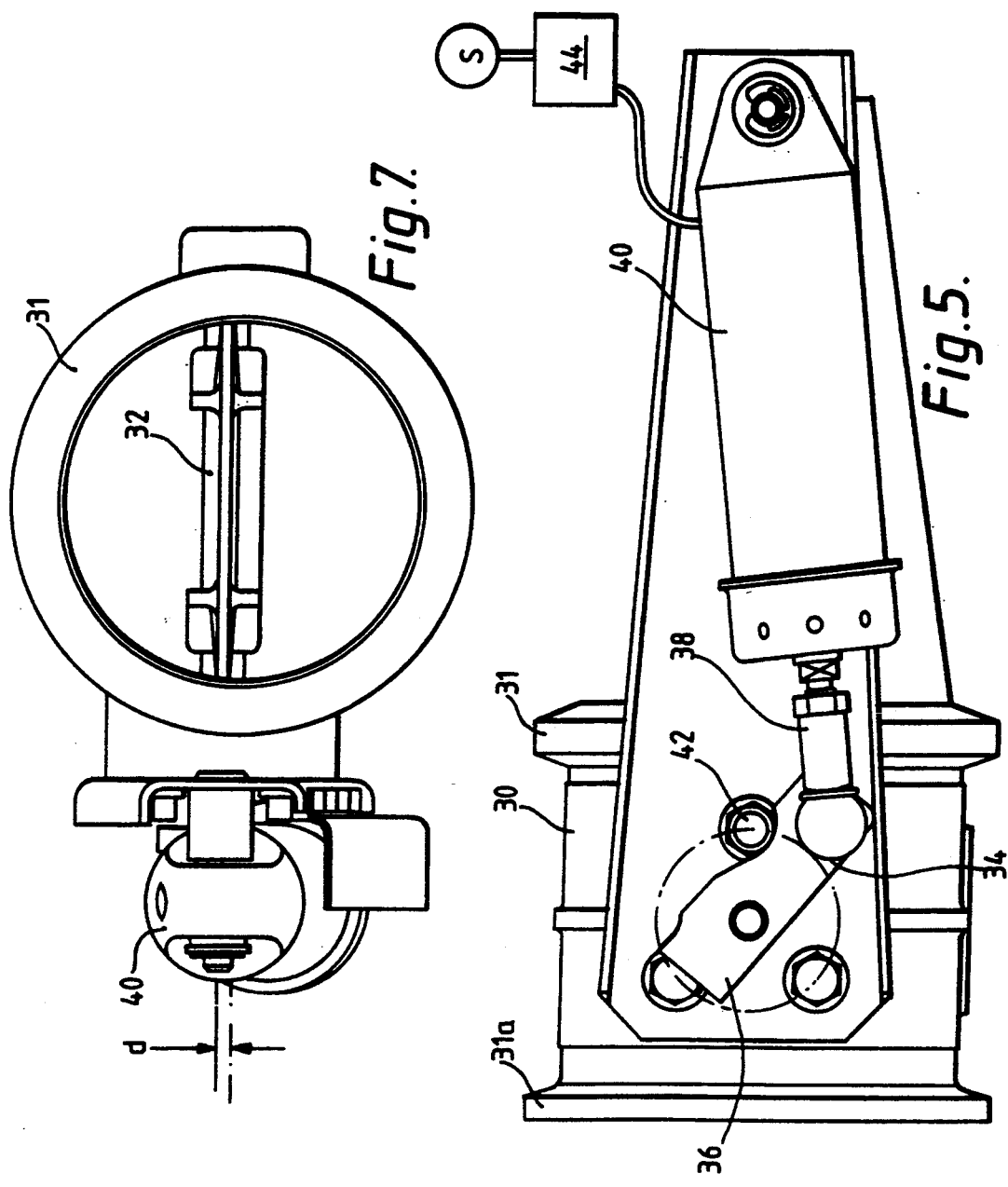

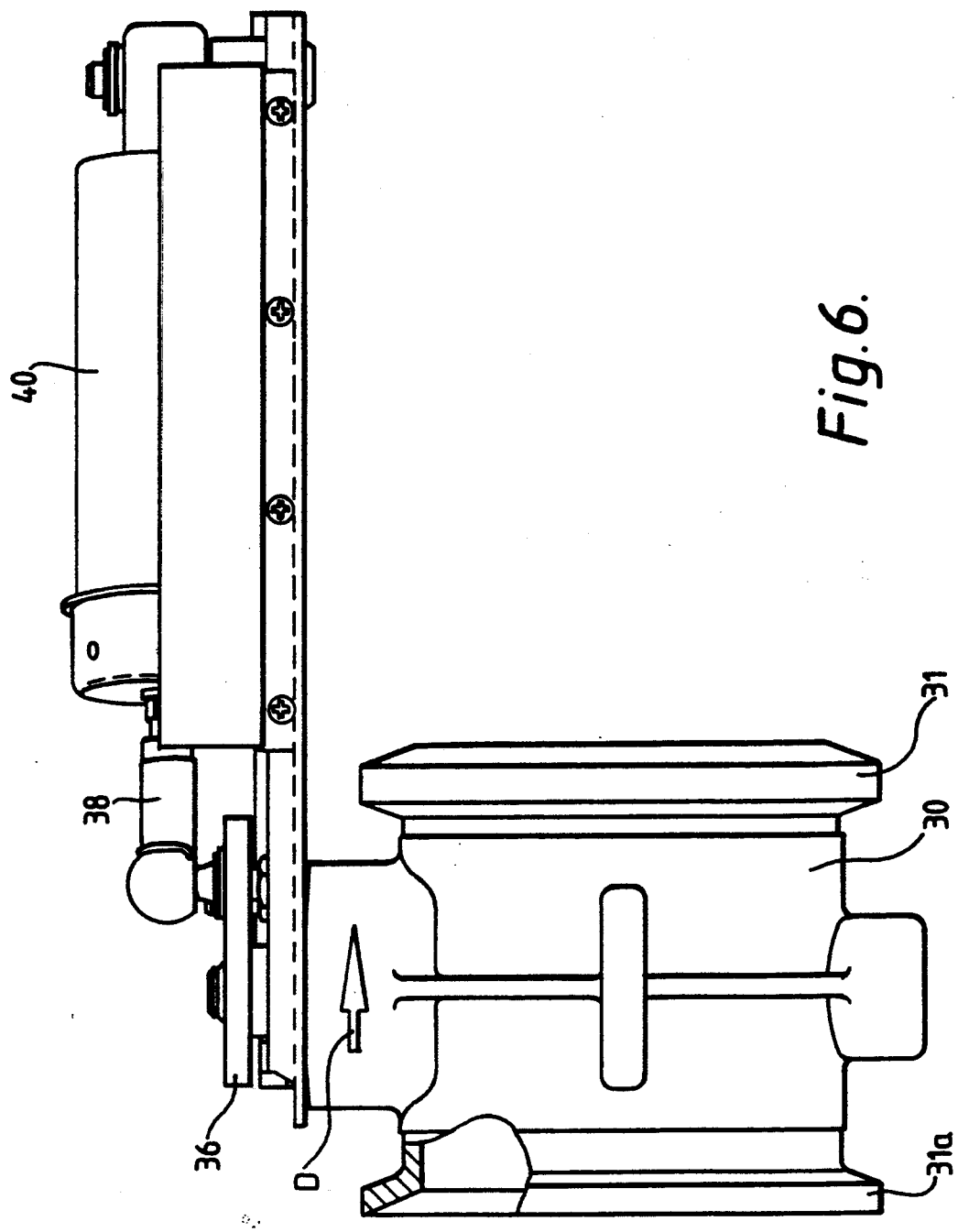

EXHAUST PRESSURE MODULATION VALVE

This invention relates to an exhaust pressure modulation valve, and in particular to a valve for the exhaust system of a diesel engined vehicle.

Devices known as 'exhaust brakes' can be fitted into the vehicle exhaust system and which, by generating a back pressure, can assist the vehicle in braking. Similar devices, termed 'warm-up' valves, can also assist in cab heating and in reducing the emission of unburnt hydrocarbons by reducing the time for the engine to reach normal operating temperature.

In general the greater the back pressure generated by an exhaust brake, the more effective the braking effect becomes. But the level of back pressure generated (typically 2-8 bar) must not exceed the maximum design back pressure of the engine, which is limited, for example, by the load of the engine exhaust valve springs.

To limit the back pressure, the exhaust brake, normally a butterfly valve or a sliding gate, must either be locked into a position which is almost but not quite closed, allowing some exhaust gas to escape around the edge, or have one or more bleed passages formed in or around the butterfly or sliding gate. It is usual in practice to drill a hole or holes, and allow the butterfly or gate to sit in a fully closed position. The leakage rate is determined by the size and number of bleed passages and is dictated by the maximum allowable back pressure when the engine is running at the highest speed, and the flow of exhaust gas through the exhaust brake is thus at its maximum. Typically the bleed passages may total 200 mm$^2$ for a butterfly diameter of 100 mm, about 2.5% of total butterfly area.

It follows that at lower engine speeds, especially in the normal driving range, the bleed holes apertures are larger than is necessary to reach the maximum back pressure at these lower speeds. Accordingly such exhaust brakes are rather ineffective at moderate gas flow rates because the back pressure generated is much less than the maximum permissible.

Warm-up valves are desirable because the time for the engine to reach operating temperature is substantially reduced, typically from 80 to 40 minutes—this leads to a substantial reduction in the emission of unburnt hydrocarbons and a considerable improvement in fuel economy.

The design requirements of a warm-up valve, when used to reduce the time for the engine to reach normal temperature, are not however the same as those applicable to exhaust brakes. In general only a very small bleed passage is required, typically not more than 5 mm in diameter for a butterfly diameter of 100 mm, because the engine is running at tickover speed, and the vehicle is stationary; back pressure generated is about in the range 0.5-2.0 bar, depending on the engine application. In a typical application, the back pressure generated by a warm-up valve will be only about 25% of the maximum back pressure generated during operation of an exhaust brake. A conventional exhaust brake would thus be useless as an aid to reducing engine warm-up time because the bleed apertures are too large to generate significant back pressure at these low engine speeds and gas flow rates.

Warm-up valves may be driver operated, to minimise the time for the cab heater to begin to work, or may be operated automatically in response to emission control apparatus, to reduce the quantity of unburnt hydrocarbons exhausted whilst the engine is warming up.

A particular danger with warm-up valves is that the driver may drive off with the warm-up valve closed; because the bleed passage is very small, the back pressure generated may quickly exceed the design limit of the engine, and engine damage may follow.

The present invention seeks to provide an exhaust pressure modulation valve, which combines the functions of an exhaust brake and warm-up valve and has a single butterfly to close the exhaust tract.

According to the present invention, there is provided an exhaust pressure modulation valve comprising a body having an inlet, an outlet, and a passageway between said inlet and outlet, a butterfly pivotable in the body to close communication between said inlet and outlet, said butterfly having a spindle and said spindle pivot axis being offset from an axis of symmetry of said passageway such that a resultant torque generated in response to increasing pressure at said inlet tends to open the butterfly, said valve further comprising operating means for closing said butterfly and adapted to apply to said spindle axis a closing torque of the same magnitude as said resultant torque generated at a predetermined pressure at said inlet, and bleed means from one side of said butterfly to the other, said bleed means being sized to ensure a significant back pressure when said butterfly is in use closed and the flow of gas through said valve is significantly less than the maximum flow of gas through said valve, said bleed means having an area not greater than 0.25% of the cross-sectional area of said passageway.

Such a valve has a butterfly which reacts to inlet pressure so that the butterfly opens when the predetermined inlet pressure is exceeded. The predetermined inlet pressure is set at or just less than the safe maximum design back pressure of the engine thus ensuring that the butterfly will open if excessive back pressures are generated.

Typically said pre-determined pressure would be in the range 2-8 bar, depending on the application, and the bleed means would be sized to impose a back pressure of about 25% of maximum or about 0.5-2.0 bar at flow rates commensurate with an engine running at tickover speed.

Preferably said bleed means has a total area of less than 0.25% of the area of said butterfly. Thus the bleed means is in size an order of magnitude less than the bypass aperture in a conventional exhaust brake.

In a preferred embodiment having a butterfly area of 7850 mm$^2$, a single bleed aperture having an area of 12.5 mm$^2$ was found adequate to impose a back pressure of approximately 0.5 bar at engine tickover; the maximum permissible back pressure at maximum engine speed being about 4 bar.

The valve is safe when used in 'warm-up' mode because the butterfly will react to excessive back pressures. The area of said bleed means is too small to significantly affect reactive operation of the butterfly and in any event the pre-determined inlet pressure can be set at a level which compensates for the effect of a small throughput of exhaust gas. Such an exhaust pressure modulation valve provides three functions with a single butterfly and additionally significantly improves the effectiveness of the exhaust brake at moderate engine speeds.

Preferably said bleed means comprises a single bleed aperture; in a preferred embodiment, a hole in the butterfly is provided. In a preferred embodiment the hole is on the opposite side of said offset axis to said axis of symmetry.

In this arrangement, the bleed aperture is on the side of the butterfly with smallest area exposed to inlet pressure; accordingly the turning movement tending to open the butterfly is not reduced.

The offset of the butterfly pivot axis is typically in the range 2 to 4 mm, for a valve having a circular exhaust tract and a diameter of 100–150 mm.

In one embodiment, the butterfly spindle is loaded by a return spring and operably connected to actuator means via a control spring whereby the resultant torque tending to close the butterfly can be set by for example, appropriate selection of one or both of the springs so as to balance the opening torque generated at a predetermined level of back pressure.

This arrangement of balanced torques acting on the valve is particularly valuable because the butterfly is sensitive to very small changes in back pressure at the predetermined level at which the butterfly is set to open. Accordingly hysteresis in valve opening and closing loads is also minimal.

It is preferred that the said valve closing torque be adjustable. In the case of an actuator arranged to push or pull a torque arm pivotal with the valve, adjustment of the applied torque can be achieved by varying the length of the torque arm. This arrangement is suitable whether the actuator is mechanically electrically, pneumatically or hydraulically operated.

Pneumatic actuators are usually connected to a compressed air supply line providing line pressure to act against an internal return spring. In a preferred embodiment of the present invention such a pneumatic or indeed a hydraulic actuator is connected to the fluid supply via a pressure control valve which is preferably adjustable to control the pressure of fluid admitted to the cylinder of the actuator, whereby the resultant force (tending to close the valve) can be varied as appropriate to balance the maximum permitted back pressure.

Actuation of the butterfly may be in response to driver action, for example in exhaust brake or cab heat mode, or may be under automatic control, for example to control exhaust emissions.

The predetermined pressure at which the butterfly opens reactively may be varied by control means in accordance with engine management or other systems to suit particular operating requirements.

Embodiments of the invention will now be described by way of example with reference to the accompanying drawings in which:

FIG. 5 is a plan view of a pneumatically operated EPM valve;

FIG. 6 is a side view of the EPM valve shown in FIG. 5;

FIG. 7 is a view of the EPM valve of FIG. 5 from the outlet side.

FIG. 1 illustrates the difference between a conventional exhaust brake and a reactive exhaust brake.

The dotted line illustrates the effect of conventional exhaust brake on back pressure (P) with increasing engine gas flow (F); gas flow of course increases with increasing engine speed.

A conventional exhaust brake includes one or more relatively large holes in the butterfly so that at maximum gas flow (maximum engine speed) the back pressure developed by the exhaust brake does not exceed the maximum design back pressure of the engine—this is illustrated by point C1.

Accordingly at low gas flow rates, the butterfly holes are too large to generate an effective back pressure, and in the normal operating range of the engine, the back pressure generated may be only 20–50% of the maximum permissible illustrated—by points C2 and C3.

Figure 1:
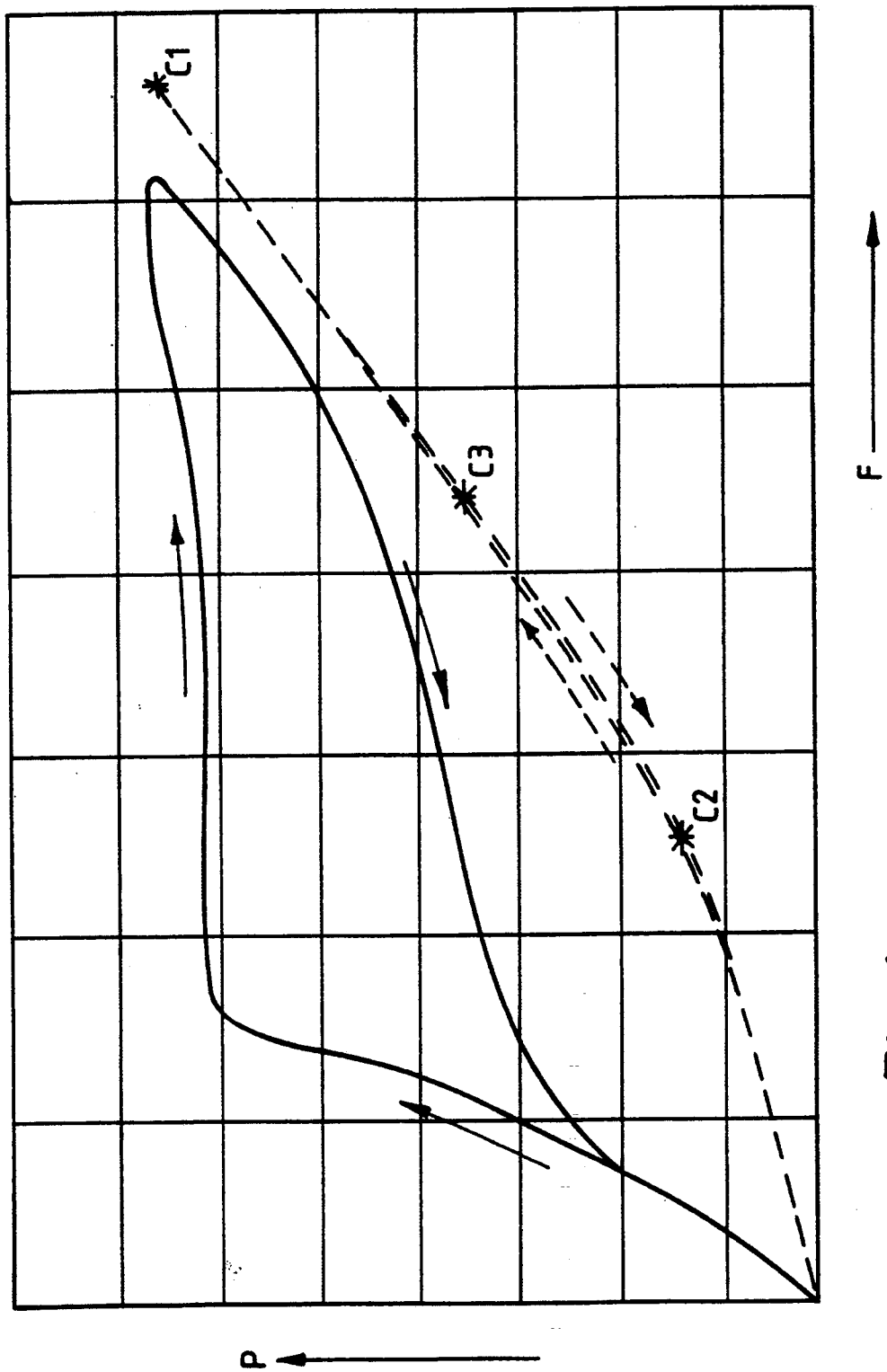
FIG. 1 is a graphical comparison of a conventional exhaust brake and an EPM valve according to the present invention.

In contrast, the solid line of FIG. 1 illustrates the operating curve of a reactive exhaust brake according to the invention. The butterfly contains only a relatively small aperture (typically less than one-tenth of the total area of the holes in a conventional exhaust brake butterfly) and thus on application the exhaust brake generates almost maximum back pressure throughout the normal operating range of the engine.

Figure 2:
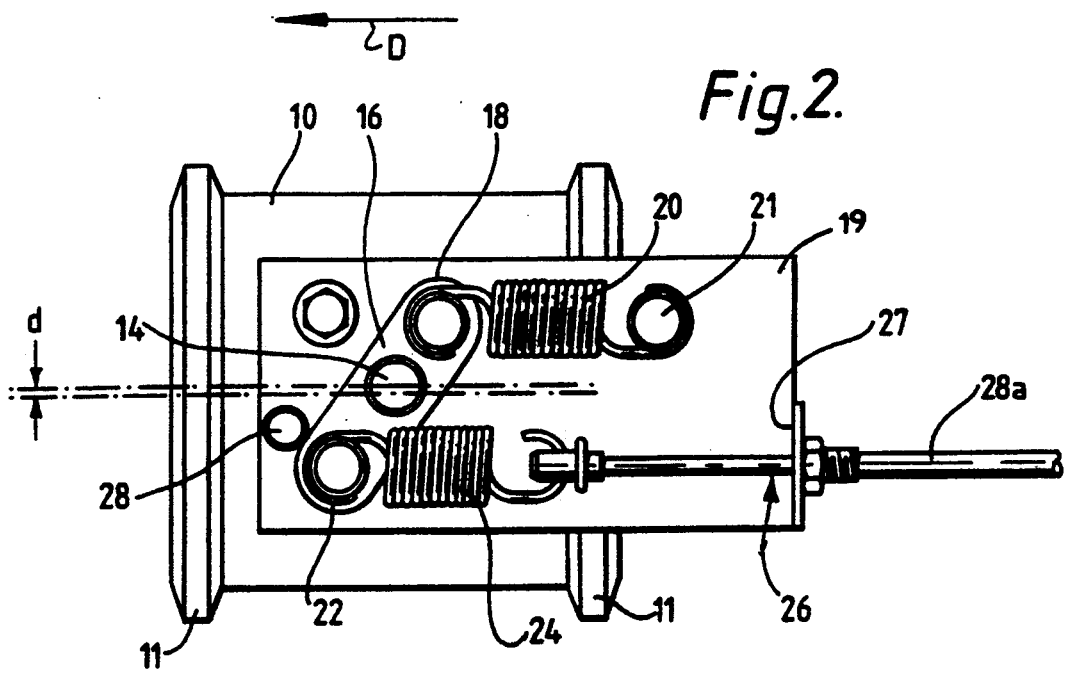
FIG. 2 is a plan view of a manually operable EPM valve.
Figures 3, 4:
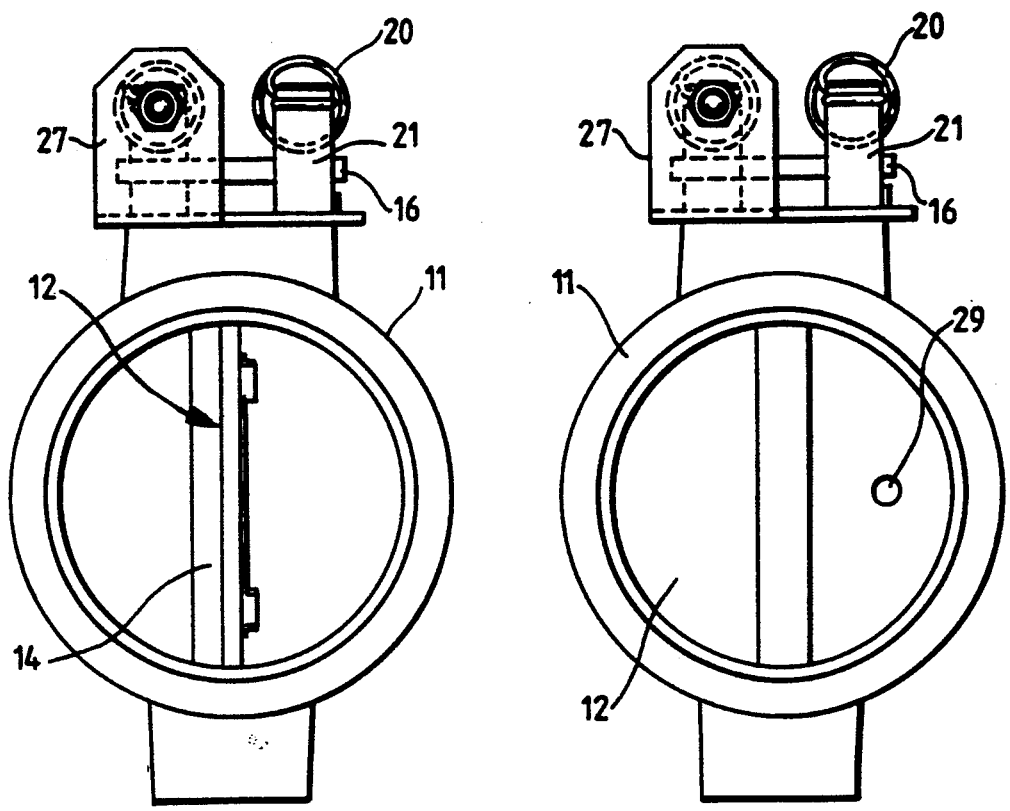
FIG. 3 is an end view of the valve of FIG. 2 from the inlet side with the butterfly open.
FIG. 4 is similar to FIG. 3 and shows the butterfly closed.

The exhaust brake of FIGS. 2–4 includes a cylindrical valve body 10 for connection by end flanges 11 to an exhaust tract and within which is a butterfly-type valve 12 mounted upon a spindle 14 to pivot about an axis displaced by a predetermined distance d (typically 3 mm for a valve of up to 5" diameter) from a diameter of the valve body 10. The direction of gas flow is indicated by arrow D. Rigidly mounted on the butterfly valve spindle 14 externally of the valve body 10 is a double ended lever 16, one end 18 of which is connected to a return spring 20 anchored at a fixed abutment 21 of a mounting plate 19. The other end 22 of lever 16 is connected via an override spring 24 to a control cable 26 leading to the vehicle cab (not shown) for operation by the driver. The mounting plate includes an abutment 27 for the cable sheath 28a.

In the illustrated position the lever 16 is held in abutment with a stop 28 by the return spring 20, the valve 12 being in the fully open position and the control cable 26 being relaxed.

In operation the valve 12 is closed by pulling the cable 26 in the direction of abutment 27, the cable spring 24 extends, generating a torque which opposes the torque of the return spring 20 and the torque generated on the spindle 14 by exhaust gas back pressure. This latter torque is a result of the spindle axis being offset from the centerline of the valve body 10.

As exhaust gas back pressure reaches the maximum permissible level, the spindle torque due to exhaust pressure increases to a point at which it balances the excess torque of cable spring 24 over return spring 20. At this point the valve is balanced with zero net torque and any further increase in exhaust pressure will tend to open the valve 12.

The valve 12 is thus reactive and opens at a pre-set back pressure to prevent engine damage while ensuring that the valve is fully effective as an exhaust brake throughout the normal operating range of the engine.

The return spring 20 is capable of re-opening the valve 12 when the closing force is removed, in this case when the cable 26 is relaxed. The offset of the valve spindle 14 allows the gas pressure to generate an opening torque proportional to the back pressure.

The valve 12 also includes a hole 29, as illustrated in FIG. 4, or a bypass through the wall of the body 10, which allows the valve to be used as a warm-up valve to bring the engine up to working temperature. In this mode the valve 12 is closed when the engine has just been started from cold. The valve imposes a relatively low back pressure on the engine (typically 1 bar) because the engine is running at slow speed (around 800 rpm) and the bleed hole 29 permits a small throughput of exhaust gas. This small back pressure dramatically reduces the time for the engine to reach normal operating temperature, typically from around 80 to 40 minutes. In the event that the engine speed increases, for example if the vehicle driver moves off without releasing the cable 26, the valve will operate as a reactive exhaust brake as described above. Engine damage when used as a warm-up valve is thus prevented.

The valve is designed to prevent back pressure being generated above prescribed levels if the butterfly is closed when the engine RPM, and thus the gas flow, is large enough to generate excessive back pressure, or if the valve is held closed while engine RPM increases above that which would generate an excessive back pressure.

A similar arrangement could be used when the valve is closed by pneumatic, electric vacuum, hydraulic or any other means.

In the case of a pneumatically operated butterfly valve it is possible to make use of the return spring within the pneumatic actuator itself. One such embodiment is shown in FIGS. 5 to 7. The butterfly valve 32 and cylindrical valve body 30 with flanges 31, are arranged in substantially the same manner as shown in FIGS. 2 to 4. In this embodiment one end flange 31a is adapted for mounting directly to a turbocharger outlet. One end 34 of the lever 36 is connected to an adjustable piston rod 38 of a pneumatic actuator 40 held by the actuator return spring against the stop 42 with the butterfly 32 in the fully open position. Spindle offset is indicated by 'd', and gas flow by arrow D.

The butterfly 32 is closed by compressed air supplied to the actuator 40 by a pressure control valve 44 connected to a source S of compressed air, the air supplied acting against the actuator return spring to generate a closing torque on the butterfly valve 32 and urge the valve closed.

The pressure of air supplied to the actuator is controlled by the valve 44 which is set to hold the valve closed against the actuator return spring and the torque generated by the exhaust gas at the prescribed maximum back pressure level.

If the back pressure starts to rise under the action of increased exhaust gas flow an imbalance is created, and the resulting torque combined with the actuator return spring torque overcomes the pneumatic actuator torque so that the valve opens returning the back pressure to the prescribed level.

The level of back pressure required can be achieved by a combination of butterfly offset, lever length, actuator return spring and the pressure of air supplied to the actuator.

Another method of giving a suitable actuator load is to dispense with the pressure control valve and vary the actuator return spring or springs. The spring or springs may be adjustable at the actuator or selected to apply a predetermined load to suit a particular application.

We claim:

1. An exhaust pressure modulation valve comprising a body having an inlet, an outlet, and a passageway between said inlet and outlet, a butterfly pivotable about a spindle pivot axis in the body to close communication between said inlet and outlet, said butterfly having a spindle and said spindle pivot axis being offset from an axis of symmetry of said passageway such that a resultant torque generated in response to increasing pressure at said inlet tends to open the butterfly, said valve further comprising operating means for closing said butterfly and adapted to apply to said spindle pivot axis a closing torque of the same magnitude as said resultant torque generated at a pre-determined pressure at said inlet, and a bleed means from one side of said butterfly to the other, said bleed means being sized to impose a significant back pressure when said butterfly is in use closed and the flow of gas through said valve is significantly less than the maximum flow of gas though said valve, wherein said bleed means comprises an aperture in the butterfly.

2. A valve according to claim 1 wherein said bleed aperture is on the opposite side of said pivot axis to said axis of symmetry.

3. A valve according to claim 1 wherein the cross-sectional area of said bleed means is less than 0.25% of the cross-sectional area of said butterfly.

4. A valve according to claim 1 wherein said operating means comprises a lever attached to said spindle and external to said body, actuating means being attached to said lever and adapted to apply a closing torque to said spindle.

5. A valve according to claim 4 wherein said lever has one side connected to a return spring thereby to impose an opening torque on said spindle, and the other side connected in series by a control spring to an actuator.

6. A valve according to claim 5 wherein said lever is double ended, one end of the lever being connected to said return spring and the other end to said control spring.

7. A valve according to claim 5 wherein said return spring and said control spring are tension springs.

8. A valve according to claim 4 wherein said actuating means comprise a fluid actuator having an internal return spring.

9. A valve according to claim 8 and further comprising an adjustable fluid pressure control valve operable to vary the pressure of fluid admitted to said actuator.

10. A valve according to claim 1 wherein said bleed means is provided at said butterfly.

* * * * *